United States Patent
Beneker et al.

(10) Patent No.: US 8,328,154 B2
(45) Date of Patent: Dec. 11, 2012

(54) HEIGHT-ADJUSTABLE MOTOR VEHICLE SEAT WITH A SPINDLE DRIVE

(75) Inventors: Wilfried Beneker, Leichlingen (DE); Burkhard Becker, Solingen (DE); Antal Teer, Mettmann (DE)

(73) Assignee: C. Rob. Hammerstein GmbH & Co., KG, Solingen (DE)

( * ) Notice: Subject to any disclaimer, the term of this patent is extended or adjusted under 35 U.S.C. 154(b) by 281 days.

(21) Appl. No.: 12/714,128

(22) Filed: Feb. 26, 2010

(65) Prior Publication Data

US 2010/0213341 A1 Aug. 26, 2010

(30) Foreign Application Priority Data

Feb. 26, 2009 (DE) .................. 10 2009 010 398
Feb. 24, 2010 (DE) .................. 10 2010 002 278

(51) Int. Cl.
*F16M 13/00* (2006.01)
(52) U.S. Cl. ....... 248/419; 248/420; 248/565; 74/89.14; 74/89.23
(58) Field of Classification Search .................. 248/419, 248/429, 565, 420, 421; 74/89.14, 89.23; 280/802
See application file for complete search history.

(56) References Cited

U.S. PATENT DOCUMENTS

| | | | | |
|---|---|---|---|---|
| 2,927,627 | A * | 3/1960 | Lohr | 248/429 |
| 3,617,021 | A | 11/1971 | Littmann | |
| 3,756,552 | A * | 9/1973 | Wilhelms et al. | 248/565 |
| 3,794,135 | A * | 2/1974 | Ewert et al. | 280/802 |
| 4,479,626 | A * | 10/1984 | Kluting et al. | 248/420 |
| 4,616,874 | A | 10/1986 | Pietsch et al. | |
| 4,802,374 | A | 2/1989 | Hamelin et al. | |
| 4,995,580 | A * | 2/1991 | Fujii | 248/421 |
| 5,014,958 | A | 5/1991 | Harney | |
| 5,222,402 | A * | 6/1993 | White et al. | 74/89.14 |
| 5,467,957 | A | 11/1995 | Gauger | |
| 5,735,500 | A * | 4/1998 | Borlinghaus et al. | 248/419 |
| 6,578,920 | B2 * | 6/2003 | Delmas et al. | 297/344.17 |

FOREIGN PATENT DOCUMENTS

| | | |
|---|---|---|
| DE | 34 20 104 C2 | 12/1984 |
| DE | 100 44 851 A1 | 6/2002 |
| EP | 0 655 364 A1 | 5/1995 |
| WO | WO 86/06036 | 10/1986 |

* cited by examiner

*Primary Examiner* — Anita M King
(74) *Attorney, Agent, or Firm* — McCarter & English, LLP

(57) ABSTRACT

An adjustable motor vehicle seat comprises an adjustment device. The adjustment device comprises a spindle drive equipped with a spindle, and having a first articulation area and a second articulation area. The adjustment device is adjustable in an adjustment direction. The spindle extends in an angle of one of alpha ($\alpha$) >2° and alpha >10°, to the adjustment direction.

7 Claims, 8 Drawing Sheets

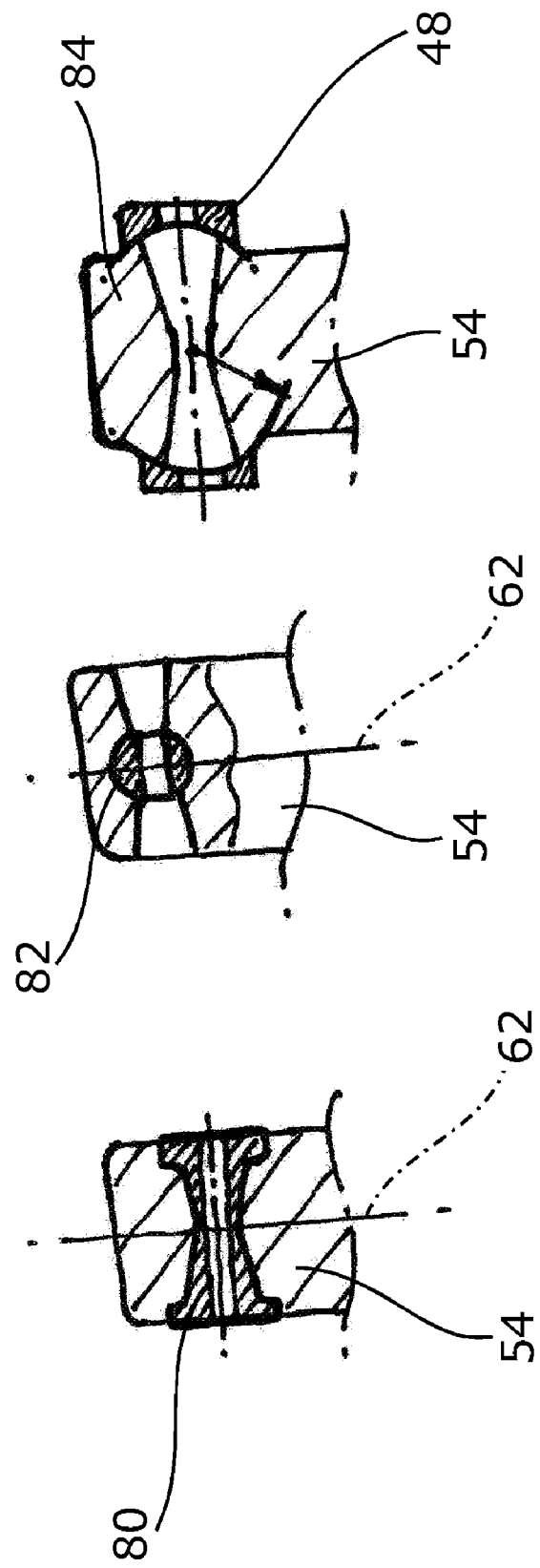

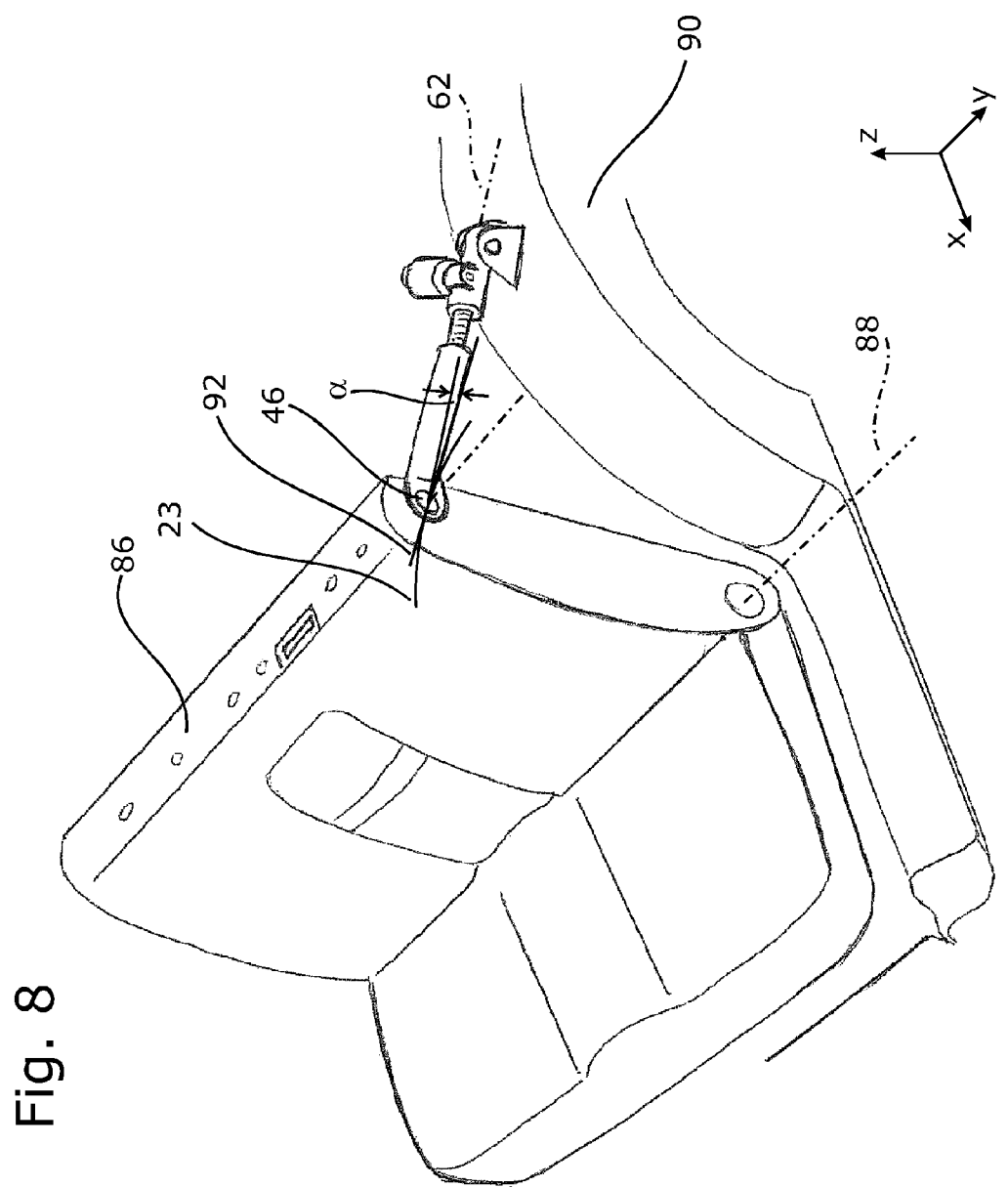

HEIGHT-ADJUSTABLE MOTOR VEHICLE SEAT WITH A SPINDLE DRIVE

CROSS-REFERENCE TO RELATED APPLICATIONS

This patent application claims priority to co-pending German Patent Application DE 10 2009 010 398.8, filed Feb. 26, 2009, which is hereby expressly incorporated by reference in its entirety as part of the present disclosure.

BACKGROUND OF THE INVENTION

The invention relates to an adjustable motor vehicle seat, and in particular to a height-adjustable motor vehicle seat, said seat comprising a) a longitudinal adjustment device with two pairs of rails each comprising a floor rail and a seat rail, said longitudinal adjustment device being adjustable in a longitudinal adjustment direction parallel to the x-direction, b) two rockers each hinged to a seat rail, c) a cross bar connected with the two rockers and extending parallel to the y-direction, and d) a spindle drive comprising a spindle, a first articulation area and a second articulation area, wherein the first articulation area is fixed to a seat rail and the second articulation area is fixed to the cross bar.

BRIEF DESCRIPTION OF RELATED ART

Such a motor vehicle seat is known from DE 100 44 851 A1. In this motor vehicle seat, the spindle drive is disposed in the x-z-plane, as is a seat side part. The spindle drive has a small parallel distance from the seat side part. Counter-moments arise upon actuation of the spindle drive. A securing element gripping around the spindle at least partially is provided for securing the spindle drive against possible buckling in the event of a crash.

Already during normal operation, a certain lateral deflection inevitably occurs due to the forces arising in operation. This leads to irregular stresses on the spindle nut and to drawbacks connected therewith, in particular higher wear and the generation of noise. Moreover, the previously known motor vehicle seat is disadvantageous with respect to the space required by the spindle drive. The spindle drive requires a sufficient distance everywhere from a seat rail or a side part of the seat support. However, the space beneath the seat support is limited, because many drives and control elements are to be accommodated there.

With regard to the prior art, reference is also made to WO 86/06036, U.S. Pat. No. 5,467,957 A, EP 0 655 364 A1, U.S. Pat. No. 5,014,958 A, U.S. Pat. No. 3,617,021 A and DE 34 20 104 C2.

BRIEF SUMMARY OF THE INVENTION

Based on the motor vehicle seat of the type mentioned in the introduction, the invention is based on the object of improving the cooperation between the spindle and the spindle nut, and to avoid or at least reduce a lateral deflection of the spindle in normal operation as well as in the event of a crash.

The object is achieved, based on a motor vehicle seat of the type mentioned in the introduction, by the spindle extending in an angle of >2°, preferably >10° to the adjustment direction. In contrast to the prior art, the spindle drive is now installed in an oblique way.

Preferably, the spindle drive, measured in the y-direction, has a greater distance from the seat rail either in the front or in the rear. On its end portion that is closer to the seat rail than the other one, it can be fixed relatively close to the seat rail or a side part of the seat support; it thus is significantly less distant in this area than in the prior art. Preferably, the center line in this articulation area intersects the side part or the seat rail.

On the whole, a reinforcing triangle is obtained. This is formed by the spindle drive, and adjustable part such as a rocker, and a rigid area, such as a seat side part or a seat rail. A backrest, the inclination of which is to be adjusted; a front pivoting unit, the inclination of which is to be adjusted etc. may also constitute the adjustable part. The rocker may be a front or rear rocker. The rigid area may also be, for example, a structural part of the motor vehicle.

The adjustment direction can be either rectilinear or arcuate. In the case of a rectilinear adjustment direction, the spindle has the above-mentioned angle of >2°, preferably >10°, to the rectilinear adjustment direction. If the adjustment direction is a curve, then the spindle has the above-mentioned angle >2°, preferably >10°, with the current tangent on the adjustment curve; this tangent specifies the direction that is the adjustment direction in the observed point of the curve. In the case of a curved adjustment direction, the latter preferably follows a circular arc. The circular arc defines a plane. The adjustment direction then extends in an angle of >2°, preferably >10° relative to this plane.

An alternative formulation of the invention would be that the adjustable motor vehicle seat comprises an adjustment device comprising a spindle drive having a spindle, a first articulation area and a second articulation area, wherein the adjustment device can be adjusted in an adjustment direction by means of the spindle drive, and the spindle extends in an angle of 90° plus/minus alpha relative to the y-axis, with alpha ($\alpha$) being >2°, preferably >10°.

Preferably, a cross bar is provided; it preferably connects the two rockers, be it the front rockers or the rear rockers, to form a rigid, U-shaped unit.

The two articulation areas of the spindle drive pivot about axes that extend parallel to each other, in this case, at least one articulation area extends in an angle which is unequal to 90° to the axis, wherein the difference to 90° is at least >2°, preferably >10°, preferably, both articulation areas extend in an angle that is unequal to 90° to the axis, wherein the difference to 90° is at least >2°, preferably >10°. The invention can also be defined such that the spindle drive extends in an angle that is unequal to 90° to two parallel axes of the articulation areas, wherein the difference to 90° is at least >2°, preferably >10°.

The inclined position of the articulation area causes, at least in one articulation area, the pivoting axis of this articulation area not to extend parallel to the y-direction anymore, as is the case in the prior art, but rather to include an angle with the latter, with the angle changing during motion. Special measures, such as a diabolo-shaped bearing, elastic bearing or the like, provide compensation in this regard. Such a bearing is referred to as a universal joint.

The spindle drive is preferably disposed on the side of the motor vehicle seat facing towards the inside of the vehicle. As in the prior art, it is directly connected with a side of the vehicle. In a preferred configuration, an electric motor of the spindle drive is furthermore disposed in the front, seen in the direction of the seat, and thus in the vicinity of the front rocker. In this way, more space is left for other units in the area between the two rockers.

Other advantages and features of the invention become apparent from the other claims as well as from the following description of exemplary embodiments of the invention, which are to be understood not to be limiting and which will be explained below with reference to the drawing.

BRIEF DESCRIPTION OF THE SEVERAL VIEWS OF THE DRAWING

FIG. 5 shows a variant of the front bearing of the spindle drive in a view as in FIG. 4, and as a detail from this Figure;

FIG. 6 shows another variant corresponding to FIG. 5;

FIG. 7 shows a third variant as seen in FIG. 5;

FIG. 8 shows a front perspective view of a vehicle seat with a pivotable backrest;

DETAILED DESCRIPTION OF THE INVENTION

Figure 1:
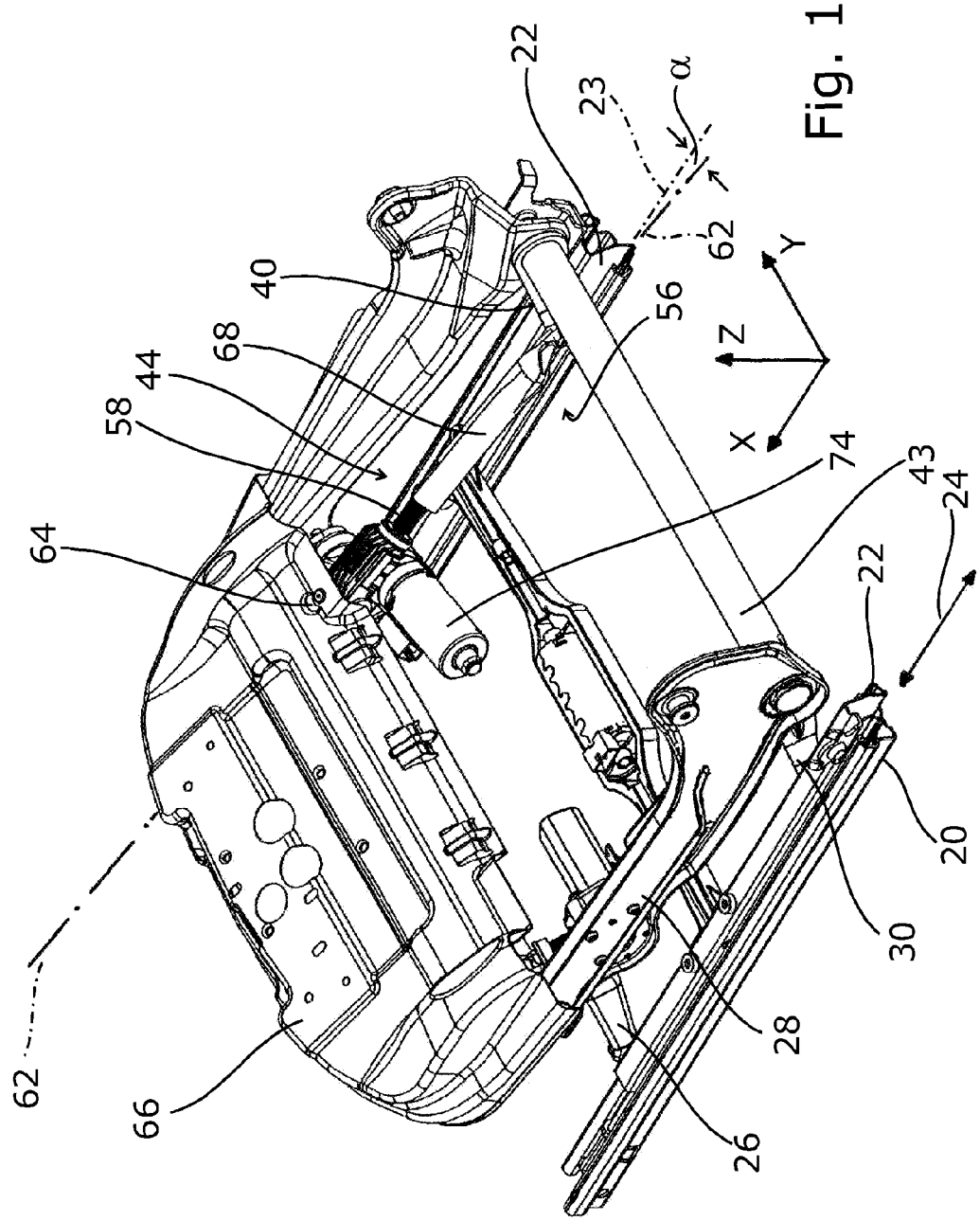
FIG. 1 shows a rear perspective view of a mechanical frame of a motor vehicle seat, but without a backrest.

The usual x-y-z-coordinate system will be used for the following description, as is customary in vehicle engineering. The x-direction denotes the normal direction straight ahead in the driving direction of a vehicle; it lies parallel to the driving plane. The y-direction denotes a direction angled 90° to the driving direction in the driving plane. The z-direction extends upwards, perpendicular to the driving plane. The coordinate system is right-handed.

The height-adjustable motor vehicle seat has a longitudinal guide with two pairs of rails; they each comprise a floor rail 20 and a seat rail 22. The longitudinal adjustment device can be adjusted in a longitudinal adjustment direction 24, see the double arrow. This longitudinal adjustment direction 24 extends in a fixed angle relative to the x-direction and lies in the x-z-plane.

The following specifications "left" and "right" each relate to the viewing direction in the normal driving direction, i.e., the positive x-direction. The left seat rail 22 is hinged via a left front rocker 26 to a left seat side part 28. In the rear area, it is also hinged via a left rear rocker to this left seat side part 28. A quadrilateral linkage is thus formed. On the other seat side, the right seat side, an analogous quadrilateral linkage is also formed from the right seat rail 22, a right front rocker 36, a right seat side part 38 and a right rear rocker 40. The two front rockers 26, 36 are rigidly connected with each other via a front cross bar 42; it extends in the y-direction. The two rear rockers 30, 40 are also rigidly connected with each other via a rear cross bar 43, which also extends in the y-direction.

A spindle drive 44 is disposed substantially diagonally in the right quadrilateral link-age, that is, on the right seat side. It has a first articulation area, which in this case is the front articulation area 46. There, it is hinged to the front cross bar 42. Specifically, a bearing bracket 48 grips around the front cross bar 42, it is U-shaped and comprises two arms of different lengths which extend at an angle to the x-direction. There, it comprises a bearing pin 50, which extends through a corresponding bearing bore in the front end portion 54 of the spindle drive 44. This will also be addressed below.

In this case, the rear articulation area 56 is a second articulation area. In it, the spindle drive 44 is pivoted on the same axis on which the right rear rocker 40 is also mounted on the seat rail 22. This axis extends in the y-direction. The bearing pin 50 is at an acute angle to the y-direction, in addition, this angle changes upon actuation of the spindle drive 44. In contrast, the axis of the second articulation area 56 remains parallel to the y-axis.

Alternatively, the other diagonal of the quadrilateral linkage can also be locked. In that case, the first articulation area is located at the lower hinge of the right front rocker. The second articulation area is located at the rear cross bar 43. In another alternative, the direction of the spindle drive 44 can, moreover, be reversed; its articulation area 46 can thus be transposed.

In an alternative, the first articulation area is not provided on one of the cross bars 42 or 43, but is associated with the corresponding rocker hinge. This particularly applies in a case where at least one of the two cross bars 42, 43 is not provided. Also, the spindle drive 44 does not have to follow a diagonal exactly, but is preferably supposed to substantially follow a diagonal. Thus, the second articulation area 46 also does not have to coincide with the rocker hinge. However, this is advantageous, because a two-fold use is thus effected.

Figure 3:
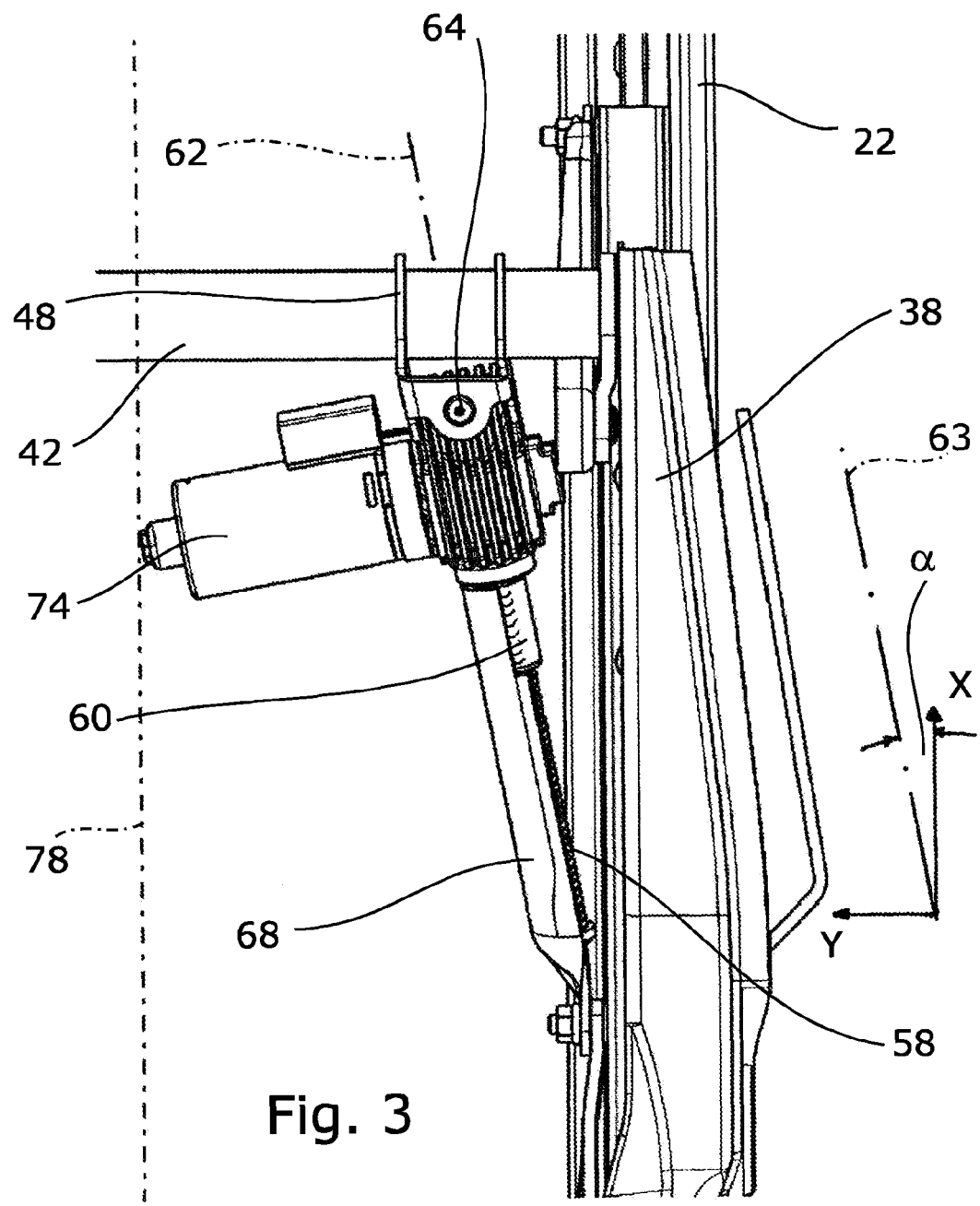
FIG. 3 shows a top view similar to FIG. 2, at a larger scale and in this case, without a front seat plate.

The spindle drive comprises a spindle 58 and a spindle nut 60 which is in engagement therewith. In a specific embodiment, but without being limiting, the spindle 58 is actively rotated. It has a spindle axis 62. 63 denotes a parallel to the spindle axis 62. As is apparent in particular from FIGS. 3 and 4, the spindle axis 62, projected onto the x-y-plane, extends in an angle $\alpha$. This angle is greater than 2°, preferably greater than 5°, in particular about 10°, as shown in the exemplary embodiments. It may also be larger, for example up to 25°. Because of this inclined position of the spindle drive, the front articulation area 46 has a significantly greater distance in the y-direction from the right seat rail 22 than the second rear articulation area 56. There, the spindle axis 62 intersects the central line in the center of the connecting area. There, the distance from the right seat rail 22 is as small as possible.

As in the state of the art, the spindle 58, as seen in the x-z-plane, includes an angle with the x-axis. This angle varies, in contrast to the angle $\alpha$, depending on the actuation of the spindle drive 44.

In contrast to the prior art, in which the spindle axis 62 is always located in the x-z-plane, the spindle axis 62 has an angle to the x-z-plane, which is greater than 2°, preferably greater than 5°, or 10°, and can be maximally 30°.

Figure 2:
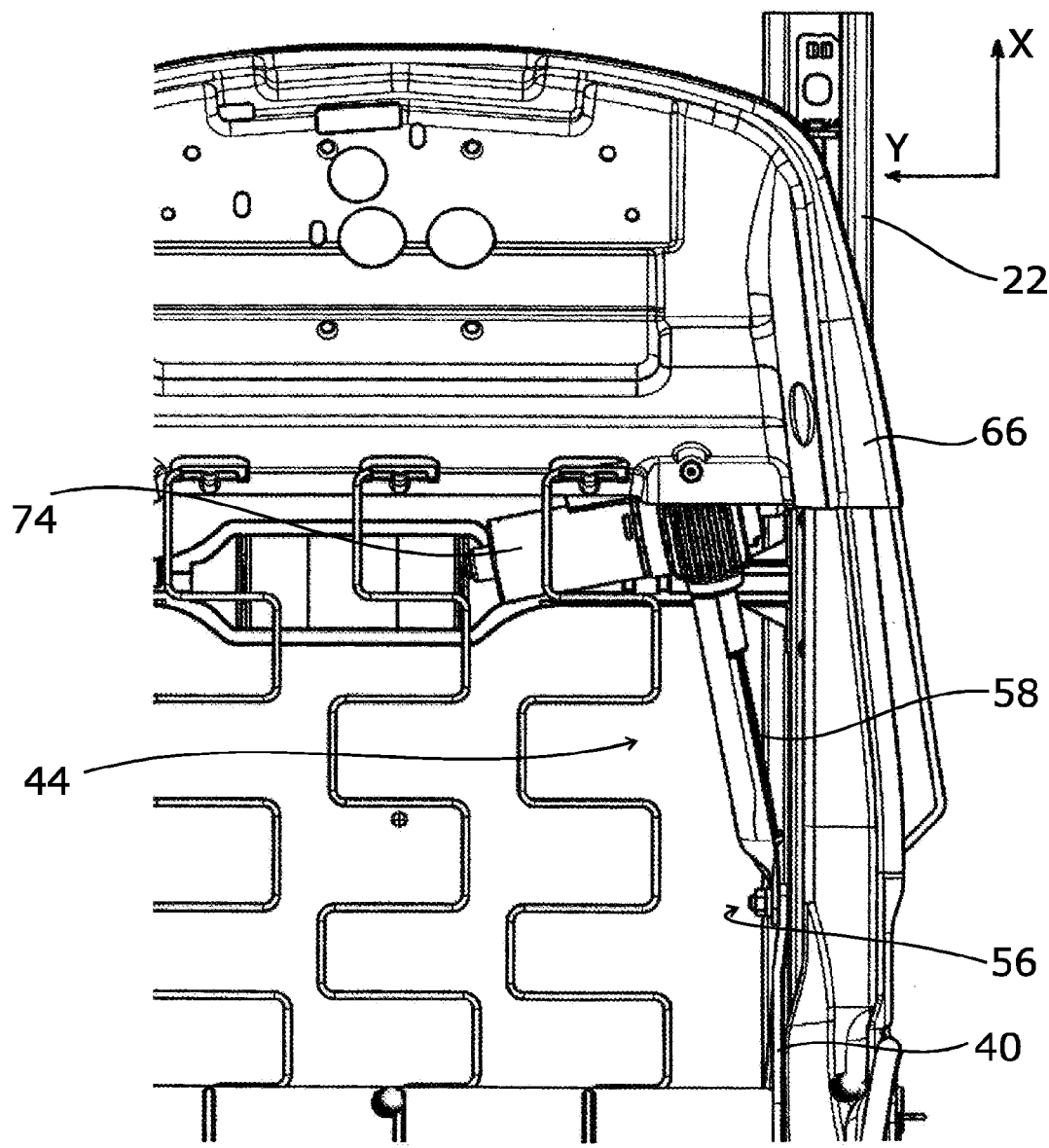
FIG. 2 shows a top view of a partial area of the frame according to FIG. 1, with a viewing direction in the negative z-direction.

The bearing bracket 48 is movable relative to the front cross bar 42 in the y-direction. Thus, the front cross bar 42 can rotate without the bearing bracket 48 being entrained. The bearing bracket 48, and thus, the front articulation area 46, is fixed by a pin 64, in particular a pop rivet, which is retained in a front seat plate 66, see FIG. 2.

The spindle nut 60 is connected with a bracket 68 which is substantially configured as an elongated half-shell and which terminates in a rear eye. This eye is part of the rear articulation area 56.

Figure 4:
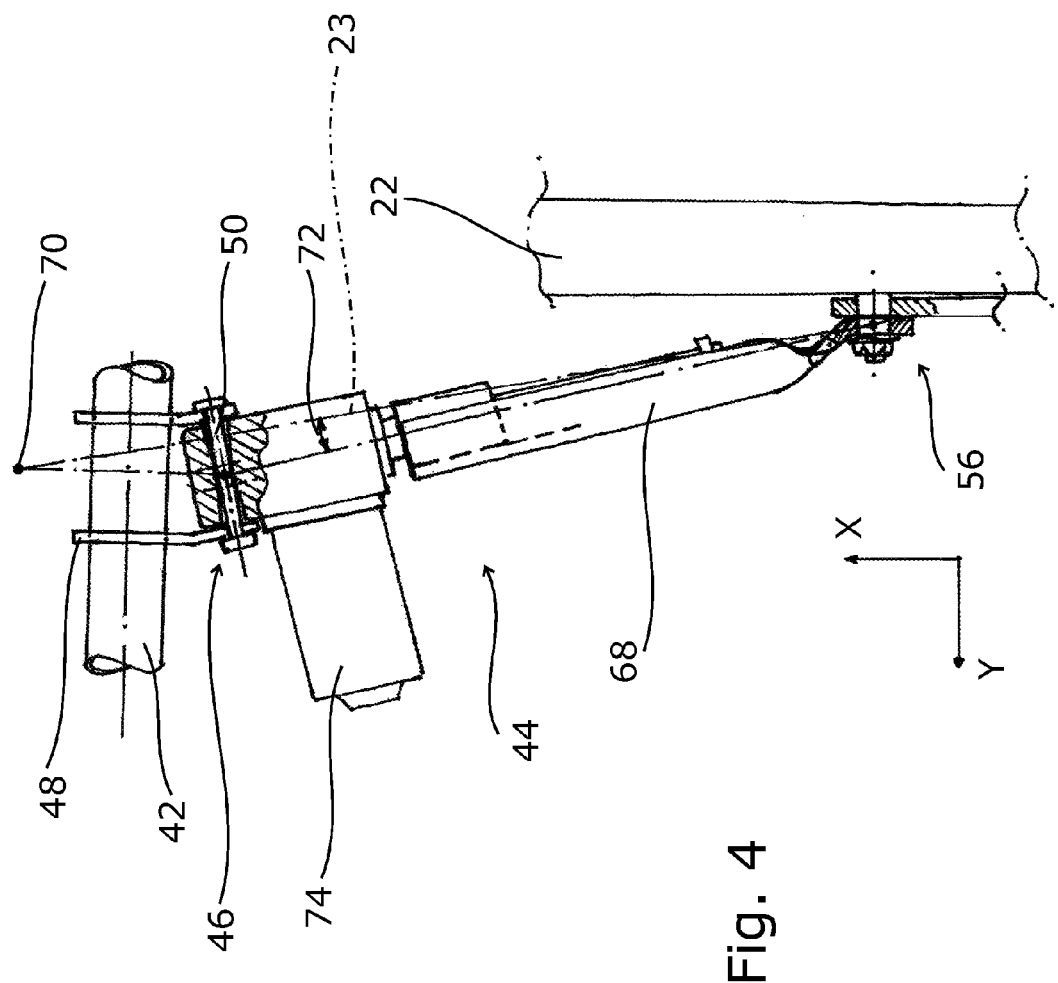
FIG. 4 shows a schematic drawing of a second exemplary embodiment in a top view with a viewing direction as in FIG. 3, partially in sectional view.

The front articulation area 46 has a special configuration, which was already pointed out. Details can be gathered from FIGS. 4 to 7. As FIG. 4 shows, the associated bearing bore is substantially diabolo-shaped. In other words, it is limited by two conical surfaces, wherein these cones are coaxial and pushed into each other with their tips, and which face each other. It is thus possible for the bearing pin 50 to move in the bearing bore within an acute-angled cone. The difference between a low position of the seat area, that is, of the two seat side parts 28, 38, for example, and a high position is thus compensated. In FIG. 4, the geometric center of the bearing pin 50, at the bottom in the high position, and on top in the low position of the seat, is indicated by the geometrical point 70. Both points are connected via a chain-dotted line with the center of the eye in the rear articulation area 56. A double arrow 72 shows the angular deviation. The bearing bore for the bearing pin 50 is configured accordingly.

The spindle drive 44 comprises an electric motor 74 with a transmission. This electric motor in the illustrations shown is located between the spindle 58 and the front cross bar 42. The actual motor is located substantially in the x-y-plane. Alternatively, it can also be oriented in the x-z-plane. The line 78 stands for the center of the seat, e.g., for the center of the front cross bar 42. This line 78 intersects the spindle axis 62 in front of the seat. In an alternative which is not shown, in intersects it behind the seat.

The exemplary embodiments according to the FIGS. 5 to 7 show different alternatives for a universal joint, that is, for the conical bore at the front articulation area 46 in FIG. 4. FIG. 5 shows an elastic rubber buffer 80, which is substantially diabolo-shaped. It has a central bore for receiving the bearing pin 50 and a thin wall thickness in the area of the geometric center of this pin, so that in the longitudinal direction, that is, in the direction of the spindle axis 62, there is only little, in particular as little as possible elasticity.

In the embodiment according to FIG. 6, a small internal calotte 82 is rotatably accommodated in a corresponding bore in the front end portion 54 of the spindle drive 44, which is still double-conical.

In the embodiment according to FIG. 7, a larger calotte, an external calotte 84 in this case, is provided. It is formed in the front end portion 54 of the spindle drive 44. Accordingly, the bearing bore forming the bearing bracket 48 is also rounded. An arrow indicates the radius.

Alternatively, a ball joint or a cardan joint can be provided as a universal joint between the spindle drive 44 and the bearing bracket 48. Instead of a spindle drive, an equivalent can also be used, such as, for example, a drive with a linear toothed rack and a pinion.

Preferably, the motor vehicle seat preferably has at least one seat side part 28, 38 and preferably, the seat side part 28, 38 is hinged to a front and a rear rocker 26, 36 or 30, 40. Preferably, a bearing bracket 48 is provided which is connected to the cross bar 42, 43, which is disposed between the cross bar 42, 43 and the spindle drive 44, and which defines a bearing axis of a bearing bore; in particular, the bearing bracket 48 is connected with the cross bar 42, 43 so as to be freely rotatable. Preferably, the spindle 58, as seen in the x-z-plane, includes an angle >5°, preferably >10°, with the x-axis.

Of the two articulation areas 46, 56 of the spindle drive, one is substantially stationary; only a rotary movement occurs there, the other articulation area, besides a pivoting movement, also executes a movement in space. This is either rectilinear or curved. It is rectilinear in the exemplary embodiment according to the FIGS. 1-4. In other words, the diagonal of the quadrilateral linkage, of which the front and rear rockers are a part, is increased or reduced in size, whereby the adjustment of the height of the seat is accomplished. The adjustment direction 23 is depicted in FIG. 4.

The exemplary embodiment according to FIG. 8 shows a motor vehicle seat. It comprises a backrest 86 the inclination of which is to be adjusted. The backrest 86 can be pivoted about a backrest axis 88. Accordingly, the pivoting path, and thus, the adjustment direction 23, is an arc about the backrest axis 88.

The spindle drive 44 is hinged to an upper end portion of the backrest 86 at a first articulation area 46. With its other end portion, the second articulation area 56, it is hinged to a part of the vehicle body 90. The adjustment direction 23 follows a circular arc. The current inclination setting of the backrest 86 lies on a point of this arc, in other words, the first articulation area 46 is located on a point of this arc. A tangent 92 to the arc at this point describes the current adjustment direction which can be obtained by the spindle drive 44. The spindle axis 62 lies at an angle α to this tangent.

This can also be expressed as follows: the arc forming the adjustment direction 23 lies in a plane which in this case is parallel to the x-z-plane. The spindle axis 62 lies at an angle α to this plane. It thus does not extend parallel, but obliquely to this plane and intersects it at an angle α.

Alternatively, this can also be expressed as follows: the arc forming the adjustment direction 23 lies in a plane which in this case is parallel to the x-z-plane. The y-axis extends at an angle of 90° to this plane. The spindle axis 62 lies at an angle of 90° plus or minus a to the y-axis.

Figure 9:
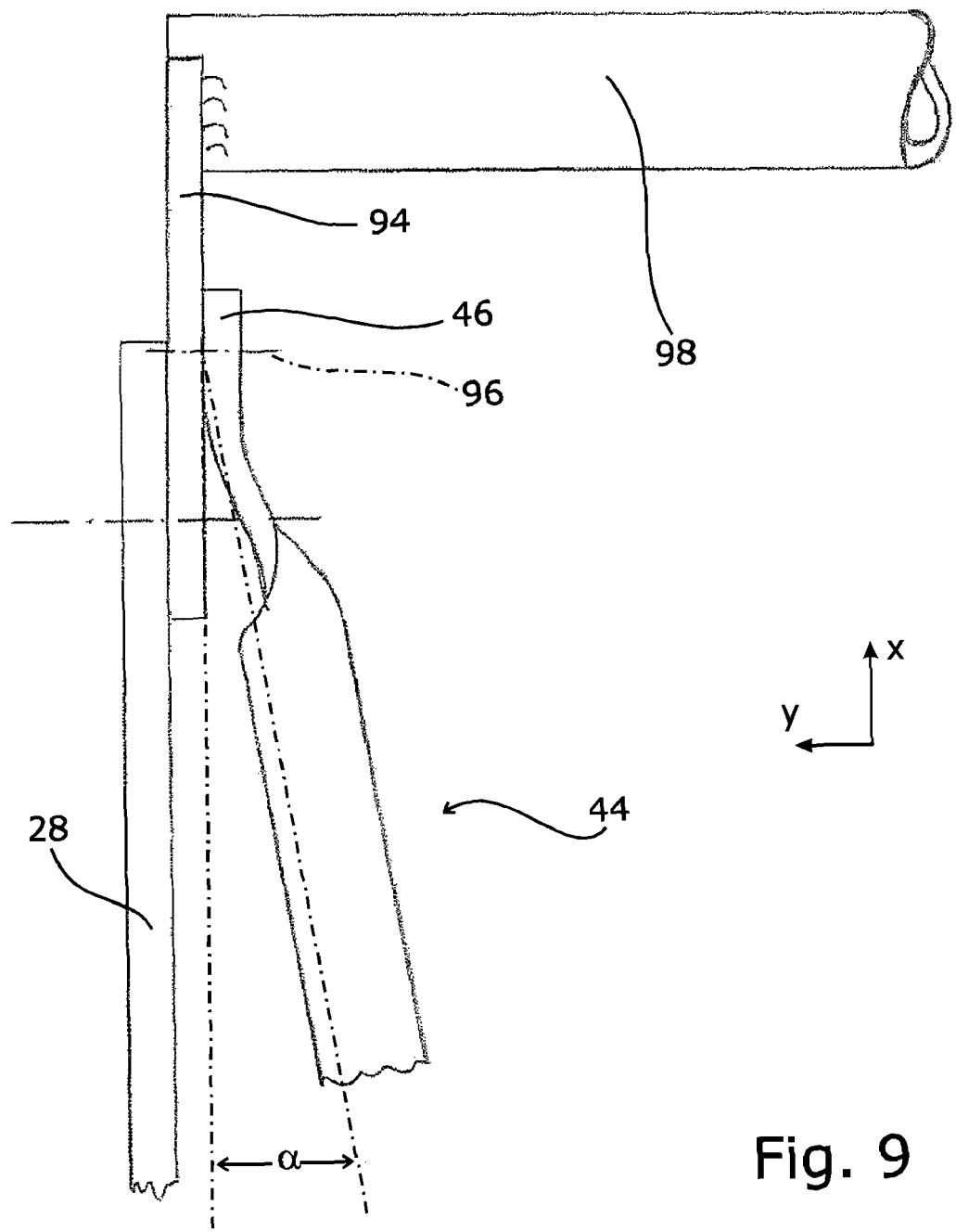
FIG. 9 shows a top view in the negative z-direction of parts of an adjustment device for a seat inclination adjustment system.
Figure 10:
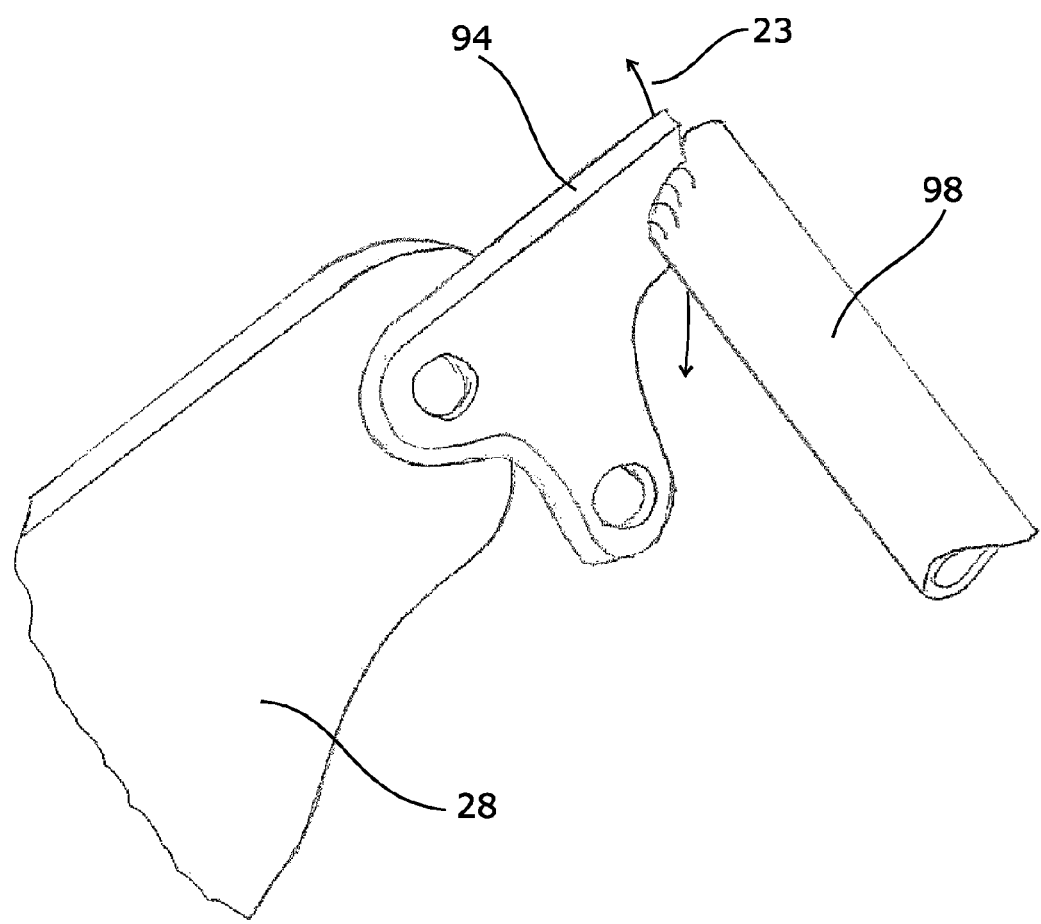
FIG. 10 shows a perspective view of some parts of the arrangement according to FIG. 9.

An adjustment device in the form of a seat inclination adjustment system is presented in the exemplary embodiment according to the FIGS. 9 and 10. An adjustment rocker 94 is pivotably hinged on the seat side part 28 about a hinge 96, the hinge axis of which extends parallel to the y-axis. Only one seat side is shown. A corresponding adjustment rocker is provided on the other seat side, namely on another seat side part 38. On their other end portion, the two adjustment rockers are rigidly connected with each other via an adjustment cross bar 98. The latter can thus pivot about an axis formed by the hinge axis 96. A spindle drive 44 is hinged in a first articulation area 46 between the hinge axis 96 and the adjustment cross bar 98 on one of the adjustment rockers 94, e.g. on the left seat side.

As FIG. 10 shows better, the adjustment rocker 94 at least of the left seat side is formed to be triangular. The arc which the adjustment direction 23 follows is also apparent from FIG. 10. In the illustration of FIG. 9, this arc extends perpendicularly to the paper plane, at least where it intersects the paper plane. Accordingly, the plane in which this arc is located also extends perpendicularly to the paper plane in FIG. 9. It can be seen that the spindle 58 or the spindle 62 forms an angle α with this plane.

How the other articulation area is configured is not shown. This second articulation area 56 can be disposed on a seat side part, one of the rear cross bars, a special component etc.

The adjustment direction 23 is the actual direction in which an adjusting movement is executed by the adjustment direction. Thus, the adjustment direction is the direction of the actual adjustment movement. In the case of a linear, e.g., rectilinear adjustment movement, the adjustment direction 23 directly includes an angle α with the spindle axis 62. In the case of a circular arc-shaped adjustment direction, the angle α can be defined as follows: the circular arc followed by the actual adjustment direction lies in a plane. The spindle axis 62 lies at the angle α to this plane.

Preferably, only one spindle drive 44 is provided on a seat side. However, this does not preclude that both seat sides are each equipped with a spindle drive 44.

The applicant reserves the right to combine any features and sub-features from the description and/or the claims with one another.

As may be recognized by those of ordinary skill in the pertinent art based on the teachings herein, numerous changes and modifications may be made to the above-described and other embodiments of the present invention without departing from the spirit of the invention as defined in the claims. For example, embodiments of the present invention incorporating the elastic rubber buffer in the universal joint may instead be made of any of numerous different materials that are currently know, or that later become known for performing the intended function of the universal joint. Similarly, the adjustment device may include an equivalent linear toothed rack and pinion instead of a spindle drive. Accordingly, this detailed description of the currently preferred embodiments is to be taken as illustrative, as opposed to a limiting sense.

What is claimed is:

1. An adjustable motor vehicle seat, comprising an adjustment device including a spindle drive having a spindle, a first articulation area and a second articulation area, said adjustment device being adjustable in an adjustment direction, wherein the spindle extends in an angle of one of alpha >2° and alpha >10° to the adjustment direction, an x-direction is a direction of normal forward travel of a car in which the adjustable motor vehicle seat is arranged, the motor vehicle seat has a longitudinal adjustment device having two pairs of rails, each pair of rails comprises a floor rail and a seat rail, and each pair of rails is adjustable in an adjustment direction that is at a fixed angle to the x-direction, a y-direction is a direction in a horizontal plane and 90° to the x-direction, a left rocker and a right rocker are provided, each of which is hinged to one of the seat rails, a cross bar is connected with the two rockers and extends parallel to the y-direction, and the first articulation area is fixed to one of the seat rails and the second articulation area is fixed to the cross bar.

2. The adjustable motor vehicle seat according to claim 1, wherein a z-direction is orthogonal to the horizontal plane and the spindle includes an angle of one of >2° and >10° with at least one of the x-z-plane and the x-y-plane.

3. The adjustable motor vehicle seat according to claim 1, wherein the cross bar is rigidly connected with the rockers.

4. The adjustable motor vehicle seat according to claim 1, further comprising at least one of a front rocker and a rear rocker, wherein the front rocker is connected to at least one of the seat rails in a front rocker hinge, the rear rocker is connected to at least one of the seat rails in a rear rocker hinge, and the first articulation area is disposed on one of the rear rocker hinge and the front rocker hinge.

5. The adjustable motor vehicle seat according to claim 1, wherein the cross bar is a front cross bar, the spindle drive includes an electric motor having a gear, and the electric motor is disposed between the front cross bar and the spindle.

6. The adjustable motor vehicle seat according to claim 1, wherein the spindle drive includes a spindle nut, and a bracket, is connected with the spindle nut and forms an end portion of the spindle drive.

7. The adjustable motor vehicle seat according to claim 1, wherein the adjustment device is an angle adjustment device having an adjustment path, the adjustment path follows an arc, and the spindle, in every point of the arc, extends at one of an angle >2° and an angle >10° to a tangent to the arc in said point.

* * * * *